(12) United States Patent
Tu (10) Patent No.: US 7,844,244 B2
(45) Date of Patent: Nov. 30, 2010

(54) METHODS, APPARATUSES, AND COMPUTER PROGRAM PRODUCTS FOR PROVIDING DYNAMIC ASSIGNMENT OF SLOT CYCLE INDEX FOR NETWORK NODES

(75) Inventor: Fangqiu Tu, Caldwell, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 619 days.

(21) Appl. No.: 11/678,119

(22) Filed: Feb. 23, 2007

(65) Prior Publication Data

US 2008/0205327 A1 Aug. 28, 2008

(51) Int. Cl.
*H04B 1/16* (2006.01)
(52) U.S. Cl. .................. 455/343.4; 455/343.1; 455/458
(58) Field of Classification Search .................. 370/310, 370/328; 455/73, 550.1, 572, 574, 403, 422.1, 455/458, 130, 334, 343.1, 343.2, 343.3
See application file for complete search history.

(56) References Cited

U.S. PATENT DOCUMENTS

| | | | |
|---|---|---|---|
| 7,047,005 B2 * | 5/2006 | Kinnavy | 455/434 |
| 7,605,701 B2 * | 10/2009 | Lee | 340/572.1 |
| 2004/0132425 A1 * | 7/2004 | Kang et al. | 455/343.1 |
| 2006/0183491 A1 * | 8/2006 | Gundu et al. | 455/518 |

* cited by examiner

*Primary Examiner*—Chi H Pham
*Assistant Examiner*—Weibin Huang
(74) *Attorney, Agent, or Firm*—DLA Piper LLP (US)

(57) ABSTRACT

An apparatus for providing dynamic assignment of slot cycle index includes a processing element. The processing element may be configured to send a registration message to a server for registering a network node to a service associated with the server, to receive a response to the registration message from the server in which the response identifies slot cycle index information, and to apply a slot cycle value at the network node based on stored information defining the slot cycle value corresponding to the identified slot cycle index information.

30 Claims, 6 Drawing Sheets

METHODS, APPARATUSES, AND COMPUTER PROGRAM PRODUCTS FOR PROVIDING DYNAMIC ASSIGNMENT OF SLOT CYCLE INDEX FOR NETWORK NODES

TECHNOLOGICAL FIELD

Embodiments of the present invention relate generally to resource management techniques, and, more particularly, relate to methods, apparatuses, and computer program products for providing dynamic assignment of slot cycle index for network nodes.

BACKGROUND

Given the ubiquitous nature of mobile electronic devices such as, for example, mobile communication devices like cellular telephones, many people are utilizing an expanding variety of applications that are executable at such mobile electronic devices. For example, applications for providing services related to communications, media sharing, information gathering, education, gaming, and many others have been developed, fueled by consumer demand. One particular area in which consumer demand has triggered an expansion of services relates to the establishment of communication sessions during which, for example, Internet telephone calls, multimedia distribution, multimedia conferences and the like may be established. Examples of protocols which may be used in such communication sessions may include, for example, Session Initiation Protocol (SIP), Motorola Push-to-Talk (M-PTT) protocol, and the like.

SIP is an application-layer control (signaling) protocol for creating, modifying, and terminating sessions with one or more participants. SIP is widely used as a signaling protocol for Voice over Internet Protocol (VoIP) and media sharing applications. SIP is addressing neutral, with addresses expressed as a uniform resource locator (URL), a uniform resource identifier (URI), a telephone number, an email like address, or the like. SIP is generally considered to be lightweight since it has a limited number of methods to reduce complexity, and transport-independent since it can be used with User Datagram Protocol (UDP), Transport Control Protocol (TCP) and other transport protocols.

M-PTT is an example of a SIP based protocol which may be employed for session based communications such as push-to-talk (PTT) communications. M-PTT signaling messages are text based messages which may be used to set up calls from one network node (e.g., a mobile terminal such as a mobile phone) to another. For example, M-PTT or another session based protocol may be used to set up a PTT call between two network nodes that have subscribed to a PTT service.

In order to enable establishment of, for example, a PTT call, an initiating node in a communication system such as a code division multiple access (CDMA) system may send a paging message over a paging channel to alert a receiving node that the initiating node is attempting to establish the PTT call. Paging channels are typically divided into time slots during which page messages and overhead information updates may be received. In order to conserve battery resources, nodes embodied as mobile terminals may be scheduled to monitor the paging channel at certain time slots. Accordingly, during time slots when a node is not monitoring the paging channel, the node may be in a sleep mode where the transceivers of the node are turned off in order to conserve battery power. The length of time during which the node stays in the sleep mode may be referred to as a sleep period or slot cycle.

Since monitoring the paging channel for a longer period of time may result in a faster loss of battery power, there is often a tradeoff between response time, which could be reduced by decreasing the sleep period, and resource conservation, which could be improved by increasing the sleep period. Slot cycle index (SCI) is a system parameter which may be used to configure the duration of the sleep period. The SCI is typically a fixed value that is set at the time of manufacture. Accordingly, if a particular mobile terminal provides a user with a response time that is perceived to be too slow, or if the particular mobile terminal is perceived to lose battery charge too rapidly based on the factory set SCI, the user would often have no choice but to obtain a new mobile terminal to remedy the situation.

Accordingly, it may be desirable to provide a mechanism by which to address at least some of the problems described above.

BRIEF SUMMARY

A method, apparatus and computer program product are therefore provided for providing dynamic assignment of slot cycle index for network nodes. Thus, for example, service providers may enable a mobile terminal to receive a change in its slot cycle index. Accordingly, users may have the option of selecting or provisioning changes to the slot cycle index of their corresponding mobile terminals. Furthermore, for example, users may select from different grades of service according to how fast they would like their mobile terminal to respond to calls such as PTT calls. The service provider may then request a slot cycle index change for a mobile terminal at any time the user may desire the change, for example, without any need for new hardware or software installation at the mobile terminal.

In one exemplary embodiment, a method of providing dynamic assignment of slot cycle index is provided. The method may include receiving a registration message for registering a network node to a service, acquiring slot cycle index information associated with the network node, and communicating the slot cycle index information to the network node.

In another exemplary embodiment, a computer program product for providing dynamic assignment of slot cycle index is provided. The computer program product includes at least one computer-readable storage medium having computer-readable program code portions stored therein. The computer-readable program code portions include first, second and third executable portions. The first executable portion is for receiving a registration message for registering a network node to a service. The second executable portion is for acquiring slot cycle index information associated with the network node. The third executable portion is for communicating the slot cycle index information to the network node.

In another exemplary embodiment, an apparatus for providing dynamic assignment of slot cycle index is provided. The apparatus includes a processing element. The processing element may be configured to send a registration message to a server for registering a network node to a service associated with the server, to receive a response to the registration message from the server in which the response identifies slot cycle index information, and to apply a slot cycle value at the network node based on stored information defining the slot cycle value corresponding to the identified slot cycle index information.

In another exemplary embodiment of the invention, a system for providing dynamic assignment of slot cycle index is provided. The system may include a provisioning sub-system configured to modify slot cycle index information at a subscriber database based on grade of service requests associated with at least one subscriber on a per subscriber basis. The system may further include a server configured to receive a registration message from a network node for registering the network node to a service, to acquire slot cycle index information associated with the network node from the subscriber database, and to communicate the slot cycle index information to the network node. In an exemplary embodiment, the subscriber database may include slot cycle information for a plurality of subscribers on a per subscriber basis and the slot cycle information is capable of modification in response to instructions from the provisioning sub-system.

Embodiments of the invention may provide a method, apparatus and computer program product for providing dynamic assignment of slot cycle index. As a result, for example, signaling messages such as M-PTT messages may be used to dynamically assign a slot cycle index in a mobile terminal. Thus, network service providers may be capable of providing different grades of services with respect to mobile terminal response time, which users may opt to change without acquiring a new mobile terminal.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Exemplary embodiments are described hereinafter with reference to the accompanying drawings, in which exemplary embodiments and examples are shown. Like numbers refer to like elements throughout.

One or more embodiments may be implemented as a method, a device, or a computer program product. Accordingly, an embodiment may take the form of an entirely hardware embodiment, an entirely software embodiment, or an embodiment combining software and hardware aspects. Furthermore, implementations of an embodiment may take the form of a computer program product including a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

In certain embodiments referenced herein, a "computer" or "computing device" may be described. Such a computer may be, for example, a mainframe, server, desktop, laptop, or a hand held device such as a data acquisition and storage device, or it may be a processing device embodied within another apparatus such as, for example, a set top box for a television system or a wireless telephone. In some instances the computer may be a "dumb" terminal used to access data or processors over a network.

In certain embodiments referenced herein, a "network" or "network system" may be referenced. Such a network may be considered for example, a personal area network (PAN), a local area network (LAN), a wide area network (WAN), the Internet, etc. Such networks may include one or more devices, such as computers and peripheral devices. The networks may be configured to communicate with one or more external devices, systems, networks, or other sources through one or more interfaces. More specifically, one or more of the computers or peripheral devices may be configured to receive and/or transmit information to or through an external device, system, network, or other external source.

Figure 1:
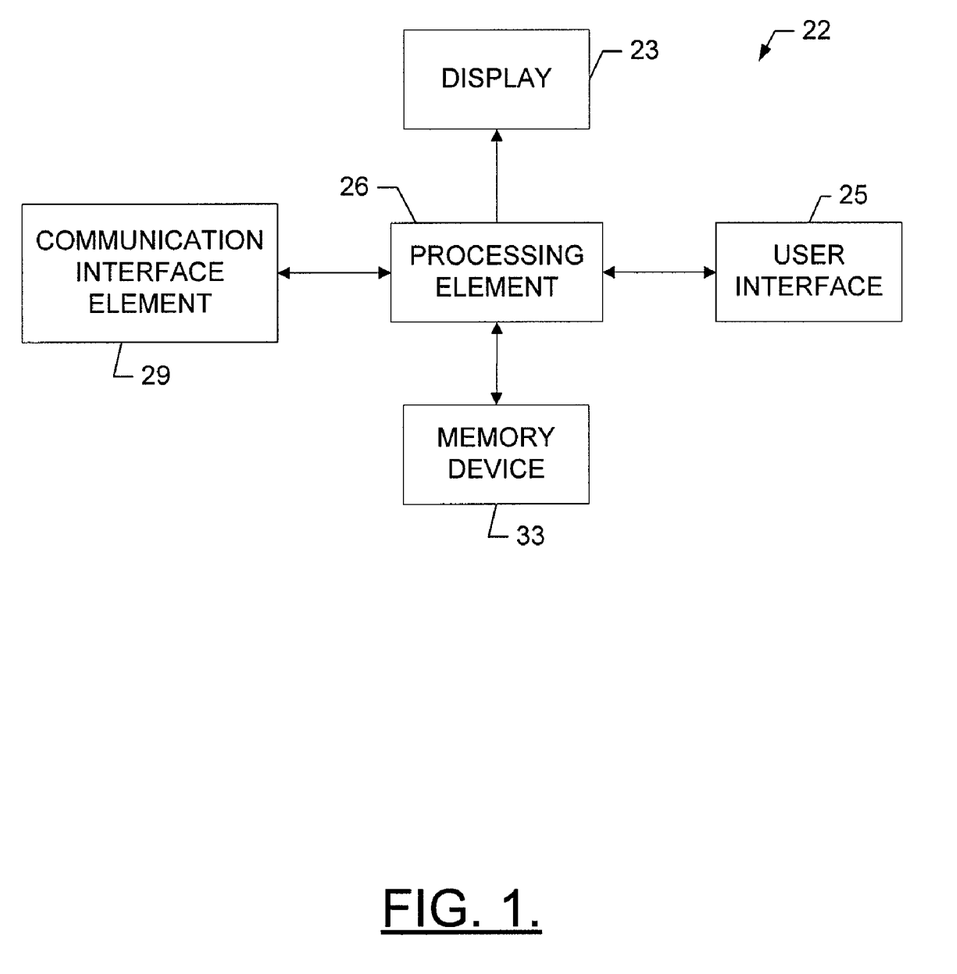
FIG. 1 is a schematic block diagram of a mobile terminal according to an exemplary embodiment of the present invention.

FIG. 1 is a schematic block diagram of a mobile terminal or network component (e.g., a network node) which may act as a client device according to an exemplary embodiment of the present invention. It should be understood, however, that a mobile terminal as illustrated and hereinafter described is merely illustrative of one type of apparatus that would benefit from embodiments of the present invention and, therefore, should not be taken to limit the scope of embodiments of the present invention. Types of mobile terminals which may employ embodiments of the present invention include but are not limited to devices such as portable digital assistants (PDAs), pagers, mobile televisions, gaming devices, music players, laptop computers, mobile telephones and other types of audio, voice and text communications systems. In addition to mobile devices, fixed devices may also employ embodiments of the present invention.

As shown in FIG. 1, in addition to a display 23 (which may be omitted for certain network components) and user interface 25, a mobile terminal 22 may include a processing element 26, a communication interface element 29 and a memory device 33. The memory device 33 may include, for example, volatile or non-volatile memory. The memory device 33 may be configured to store information, data, applications, instructions or the like for enabling the mobile terminal 22 to carry out various functions in accordance with exemplary embodiments of the present invention. For example, the memory device 33 could be configured to store an application for enabling communication with other users via a session such as a Session Initiation Protocol (SIP) session, a push-to-talk (PTT) communication session or the like. Additionally or alternatively, the memory device 33 could be configured to store other data including, for example, multimedia content for communication or sharing with other terminals.

The processing element 26 may be embodied in many ways. For example, the processing element 26 may be embodied as a processor, a coprocessor, a controller or various other processing means or devices including integrated circuits such as, for example, an ASIC (application specific integrated circuit). In an exemplary embodiment, the processing element 26 may be configured to execute instructions stored in the memory device 33 or otherwise accessible to the processing element 26. In an exemplary embodiment, the processing element 26 may be configured to execute a communication session establishment application and/or a content sharing application stored in the memory device 33 or otherwise accessible to the processing element 26. Meanwhile, the communication interface element 29 may be embodied as any device or means embodied in either hardware, software, or a combination of hardware and software that is configured to receive and/or transmit data from and/or to a network.

The communication interface element 29 may include an antenna or multiple antennae in operable communication with a transmitter and/or a receiver. Accordingly, the mobile terminal 22 may be configured to communicate signals that may include signaling information in accordance with an air interface standard of an applicable cellular system, and also user speech and/or user generated data. As such, the mobile terminal 22 may be capable of operating with one or more air interface standards, communication protocols, modulation types, and access types.

The display 23 may be, for example, a conventional LCD (liquid crystal display) or any other suitable display known in the art upon which images may be rendered. The user interface 25 may include, for example, a keyboard, keypad, joystick, function keys, mouse, scrolling device, touch screen, or any other mechanism or input device by which a user may interface with the mobile terminal 22.

Figure 2:
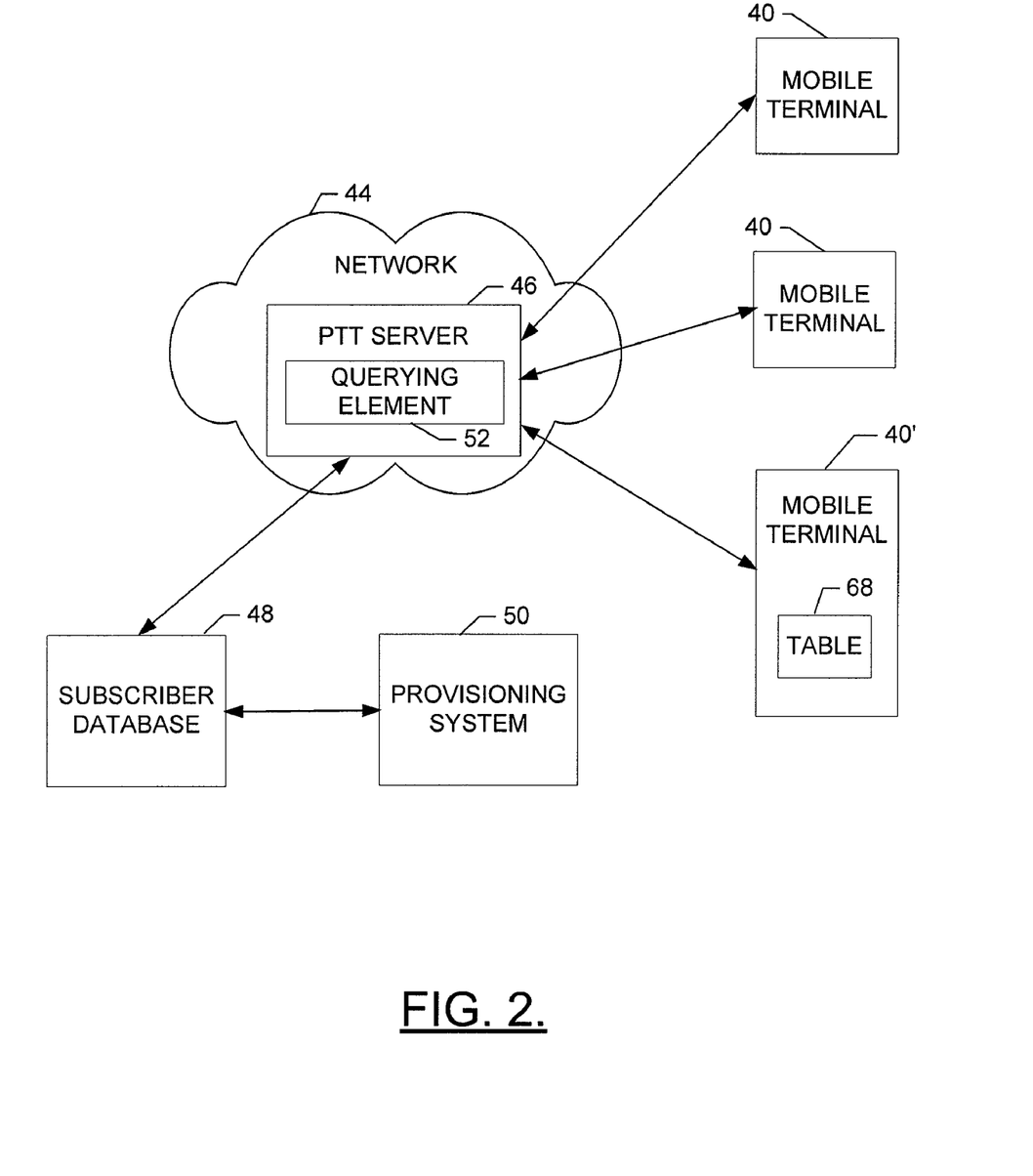
FIG. 2 is a schematic block diagram of a wireless communications system for establishing a communication session according to an exemplary embodiment of the present invention.

FIG. 2 is a schematic block diagram of a wireless communications system for establishing a communication session according to an exemplary embodiment of the present invention. In an exemplary embodiment, the system of FIG. 2 may be capable of facilitating communications in accordance with SIP (e.g., establishing a SIP session) and/or M-PTT (e.g., establishing a PTT call) although other communication protocols and communication sessions may also be utilized. As such, FIG. 2 is a simplified schematic diagram illustrating a system capable of supporting communication between network nodes such as mobile terminals 40. For example, SIP, M-PTT or the like, may be utilized to establish communication between the mobile terminals such as via a session which may be provided in connection with SIP, PTT or the like over a network 44. In this regard, it should be noted that the network 44 may include any combination of wireless or wired networks such as, for example, private networks, cellular networks, public networks, etc. The network 44 may include at least one service related server. Although a PTT service will primarily be described below for purposes of example, other types of services could also be utilized in connection with embodiments of the present invention such as, for example, voice over IP, video telephony, video instant messaging and the like.

In an exemplary embodiment in which PTT communications are supported, the server may be a PTT server 46, which may be associated with, for example, the network nodes which have subscribed to a PTT service which may be provided over the network 44. The PTT server 46 may be capable of receiving and forwarding SIP and/or PTT signaling messages and/or messages from another protocol used for session/call setup. In an exemplary embodiment, the PTT server 46 may be a server or other computing device configured to enable communication of messages, such as SIP and/or PTT signaling messages, to and/or from the mobile terminals 40. As such, the PTT server 46 may also include elements similar to those of the mobile terminal 22 described in reference to FIG. 1, except that the PTT server 46 may not include the display 23. Although signals may be described hereinafter as passing between the mobile terminals 40, it should be understood that such signals are communicated via the network 44 and also via the PTT server 46 where applicable. It should also be understood that the mobile terminals 40 may be examples of the mobile terminal 22 of FIG. 1, or any other suitable communications device.

In addition to providing communication between the mobile terminals 40, the PTT server 46 may also be in communication with a subscriber database 48, which may provide information regarding subscription information or other service related details associated with each corresponding one of the mobile terminals 40. For example, the subscriber database 48 may include details regarding a service plan associated with a user of each corresponding one of the mobile terminals 40. As such, the subscriber database 48 may include information regarding the slot cycle index associated with the user of each corresponding one of the mobile terminals 40.

The subscriber database 48 may be embodied as a storage device which could include volatile and/or non-volatile memory. In an exemplary embodiment, the subscriber database 48 may be in communication with the PTT server 46 in order to provide information regarding a specific subscriber to the PTT server 46 in response to a request from the PTT server 46. The subscriber database 48 may be updatable under the control of a provisioning system 50. In other words, information regarding subscription plans and/or service levels which are to be provided to each corresponding subscriber (and the subscriber's corresponding mobile terminal 40) may be updated at the subscriber database 48 in response to information input at the provisioning system 50.

The provisioning system 50 may be embodied as any device or means embodied in either hardware, software, or a combination of hardware and software that is configured to receive input from service provider personnel and to create, modify, update or otherwise permit service provider control over subscription related information associated with each user of or subscriber to the corresponding service associated with the provisioning system 50. In an exemplary embodiment, the provisioning system 50 may be configured to provide updated subscription information for a particular user to be stored at the subscriber database 48. The updated subscription information may include, for example, slot cycle index information. In other words, in one exemplary embodiment, the service provider may be capable of updating the subscriber database 48 with respect to the slot cycle index associated with a particular user or subscriber. The update of slot cycle index may occur, for example, in response to the user or subscriber purchasing a different service plan (or just a different slot cycle index) via communication with the provisioning system 50. Alternatively, the update of the slot cycle index may occur in response to the expiration of a previously active service plan.

In an exemplary embodiment, the provisioning system 50 may be disposed at a physical point of sale location or may be a network component which may be distributed, or which may be accessed remotely by service provider personnel for the provision of service plan or slot cycle index changes to users. It should be noted that although the provisioning system 50, the subscriber database 48 and the PTT server 46 are each shown as being separate devices in FIG. 2, any two or even all of the provisioning system 50, the subscriber database 48 and the PTT server 46 may be collocated within a single device or at a single physical location. Alternatively, the provisioning system 50, the subscriber database 48 and/or the PTT server 46 may be separate devices in communication with each other via any wired or wireless network.

In an exemplary embodiment, as shown in FIG. 2, the PTT server 46 may include a querying element 52, which may be controlled by or otherwise embodied as a processing element such as the processing element 26. The querying element 52 may be embodied as any device or means embodied in either hardware, software, or a combination of hardware and software that is configured to receive a registration message from one of the mobile terminals 40 and, in response to receipt of the registration message, query the subscriber database 48 regarding subscription related information (e.g., slot cycle index information) associated with a particular subscriber associated with the one of the mobile terminals 40. In response to receipt of the query, the subscriber database 48 may provide the querying element 52 with the requested subscription related information (e.g., the slot cycle index information). The querying element 52 may be configured to, thereafter, provide the subscription related information (e.g., the slot cycle index information) to the one of the mobile terminals 40 that sent the registration message as a portion of a response to the registration message. In an exemplary embodiment, the response to the registration message may include a field defining a slot cycle index (e.g., a slot cycle index field) for the mobile terminal based on the subscription related information (e.g., slot cycle index information) associated with the particular subscriber, thereby indicating which one of a plurality of possible slot cycle index values should be applied at the one of the mobile terminals 40.

The one of the mobile terminals 40 that had communicated the registration message to the PTT server 46 (e.g., mobile terminal 40') may be configured to access stored information regarding the mobile terminal 40'. The accessed stored information may define, for example, the slot cycle characteristics to be applied at the mobile terminal 40' based on the slot cycle index provided in the slot cycle index field. As such, in response to receipt of the response to the registration message including the slot cycle index field, the mobile terminal 40' may apply slot cycle characteristics corresponding to information received remotely via the response to the registration message.

Figure 3:
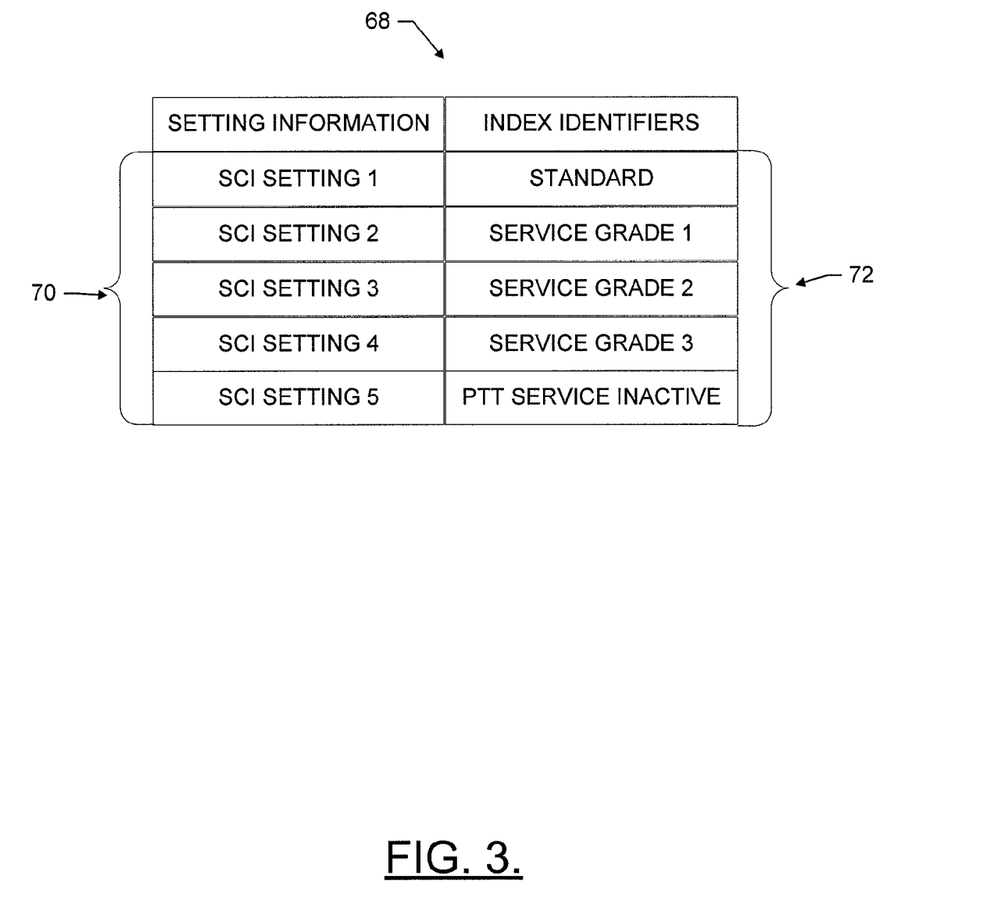
FIG. 3 illustrates an exemplary table for storing index identifiers and corresponding index information according to an exemplary embodiment of the present invention.

FIG. 3 illustrates an example of an entry or table 68, which may be stored in a memory of the mobile terminal 40' (e.g., the memory 33). As shown in FIG. 3, the mobile terminal 40' may store, in its corresponding memory, setting information 70 providing slot cycle parameters corresponding to various different index identifiers 72. As such, the response to the registration message may include the slot cycle index field identifying an index identifier. Given the index identifier, the mobile terminal 40' may access the corresponding setting information to determine which slot cycle parameter (e.g., a slot cycle value) is to be utilized for defining the slot cycle (e.g., sleep period) characteristics for the mobile terminal 40'. In an exemplary embodiment, the table 68 may be stored in non-volatile memory so the information stored therein may remain in the non-volatile memory after mobile terminal power cycling. Accordingly, the mobile terminal 40' may remotely receive information dynamically during each registration operation defining the slot cycle index for the session for which the mobile terminal 40' is registering. Thus, the mobile terminal 40' may not be hard coded to have a particular slot cycle index, but instead, a user of the mobile terminal 40' may change service plan options with respect to responsiveness of the mobile terminal 40' to paging messages without obtaining new hardware or a new mobile terminal.

It should be noted that although FIG. 3 illustrates a table, the information stored therein need not be stored in a tabular format. Furthermore, although the index identifiers 72 are shown to have names like "standard" or "service grade-1", any mechanism for identifying different indexes may be employed. For example, the index identifiers 72 could simply include a number corresponding to different values corresponding to respective setting information. In an exemplary embodiment, one of the index identifiers 72 may correspond to a PTT service not active index indicating that the PTT service is inactive. This may result from a PTT deactivation from either the user or the server. In response to either the loss of the PTT service, or receipt of a corresponding index identifier, the mobile terminal 40' may inform the network 44 and use the corresponding setting information to control its sleep mode.

Figure 4:
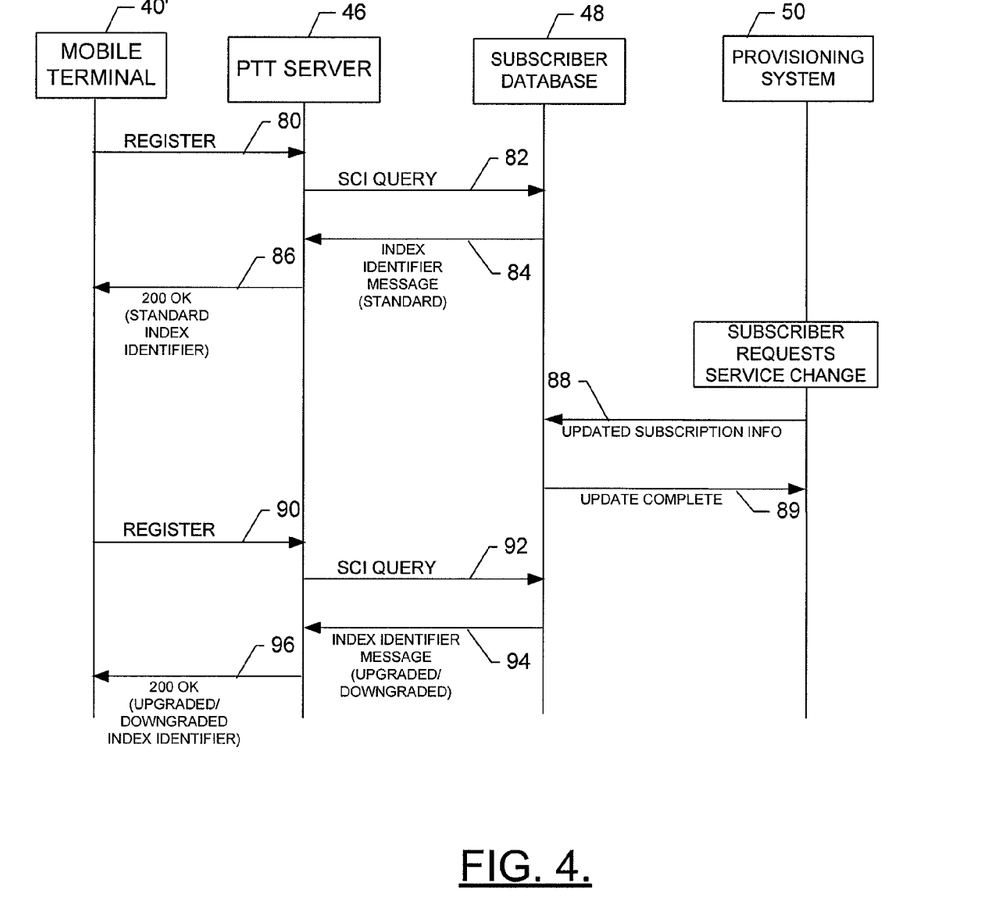
FIG. 4 is a control flow diagram illustrating communications for dynamic assignment of slot cycle index in accordance with an exemplary embodiment.

FIG. 4 illustrates a control flow diagram showing exemplary message flow for dynamically assigning a slot cycle index to the mobile terminal 40'. According to the example in FIG. 4, assume the mobile terminal 40' initially has a standard service package including a standard slot cycle index. As shown in FIG. 4, the mobile terminal 40' may communicate a registration message 80 to the PTT server 46. In an exemplary embodiment, the registration message 80 may be an M-PTT REGISTER message issued following a power up of the mobile terminal 40'. In response to receipt of the registration message 80, the PTT server 46 may communicate an SCI query 82 to the subscriber database 48 to determine the slot cycle index that should be applied at the mobile terminal 40' based on the corresponding subscriber information stored at the subscriber database 48 in connection with the subscriber associated with the mobile terminal 40'. In response to the SCI query 82, the subscriber database 48 may communicate at least an index identifier message 84 to the PTT server 46. The index identifier message 84 may indicate which slot cycle index value (e.g., via a corresponding index identifier) is to be applied at the mobile terminal 40'. In response to receipt of the index identifier message 84, the PTT server 46 may communicate a response 86 to the registration message (e.g., 200 OK) including a slot cycle index field indicative of the corresponding index identifier. The mobile terminal 40' may then access the table 68 to apply slot cycle index parameters (e.g., a slot cycle value) based on the corresponding index identifier.

If, at some later time, the subscriber associated with the mobile terminal 40' requests an upgrade (or downgrade) to the subscriber's service plan via the provisioning system 50, the provisioning system 50 may provide updated subscription information 88 to the subscriber database 48 updating the subscriber database 48 at least with respect to the slot cycle index to be applied at the mobile terminal 40'. Completion of the update at the subscriber database 48 may be communicated to the provisioning system 50 via an update complete message 89. Accordingly, if the mobile terminal 40' issues a REGISTER message 90 to the PTT server 46, the PTT server 46 may communicate an SCI query 92 to the subscriber database 48. In response to receipt of the SCI query 92, the subscriber database 48 may communicate at least an index identifier message 94 to the PTT server 46 indicating a corresponding index identifier for the upgraded (or downgraded) slot cycle index to be applied at the mobile terminal 40'. The PTT server 46 may communicate a response 96 to the registration message (e.g., 200 OK) including a slot cycle index field indicative of the corresponding index identifier for the upgraded (or downgraded) slot cycle index. The mobile terminal 40' may then access the table 68 to apply slot cycle index parameters (e.g., a slot cycle value) based on the corresponding index identifier.

Figure 5:
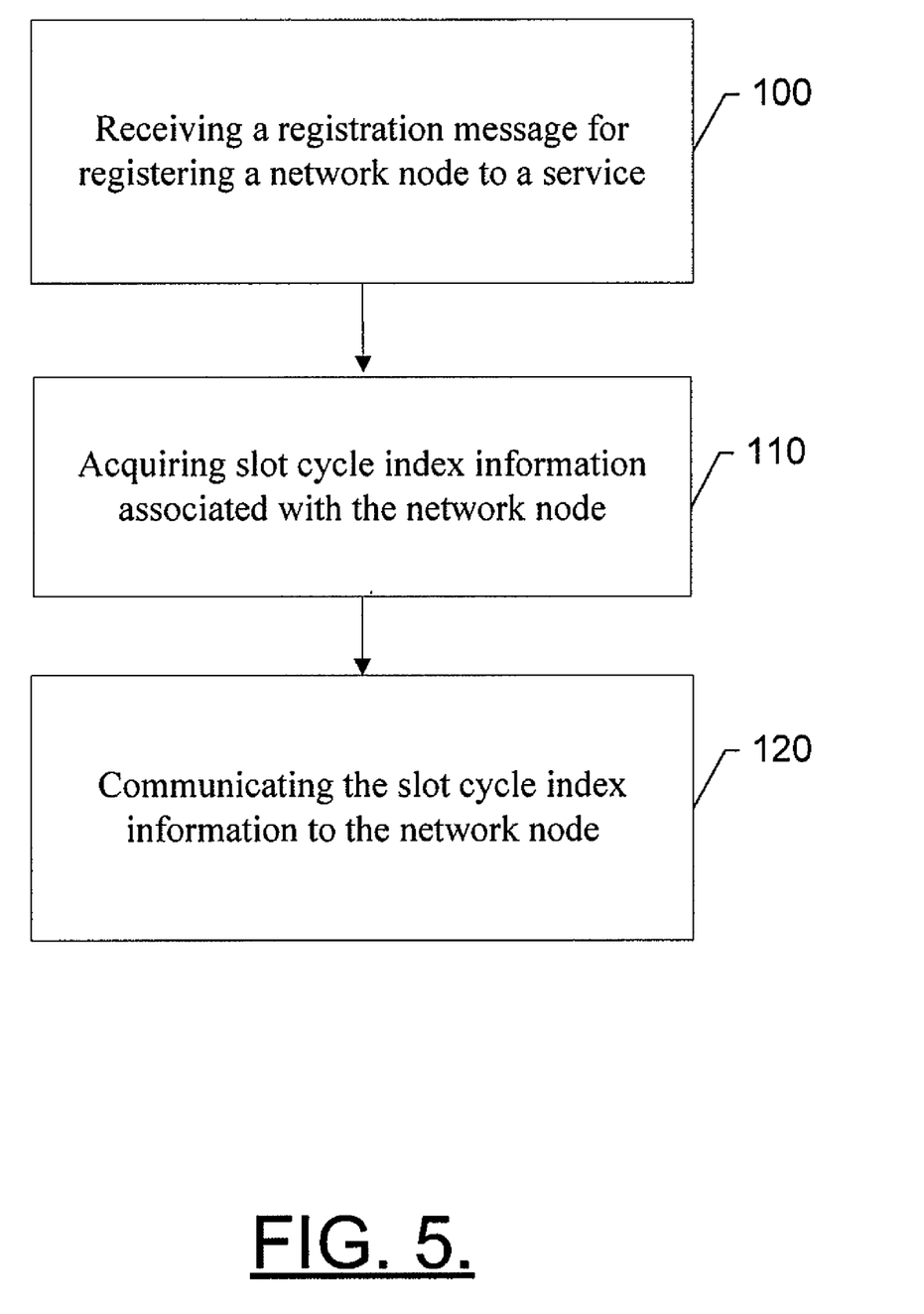
FIG. 5 is a flowchart according to an exemplary method and program product from the perspective of a server for providing dynamic assignment of slot cycle index according to an exemplary embodiment of the present invention.
Figure 6:
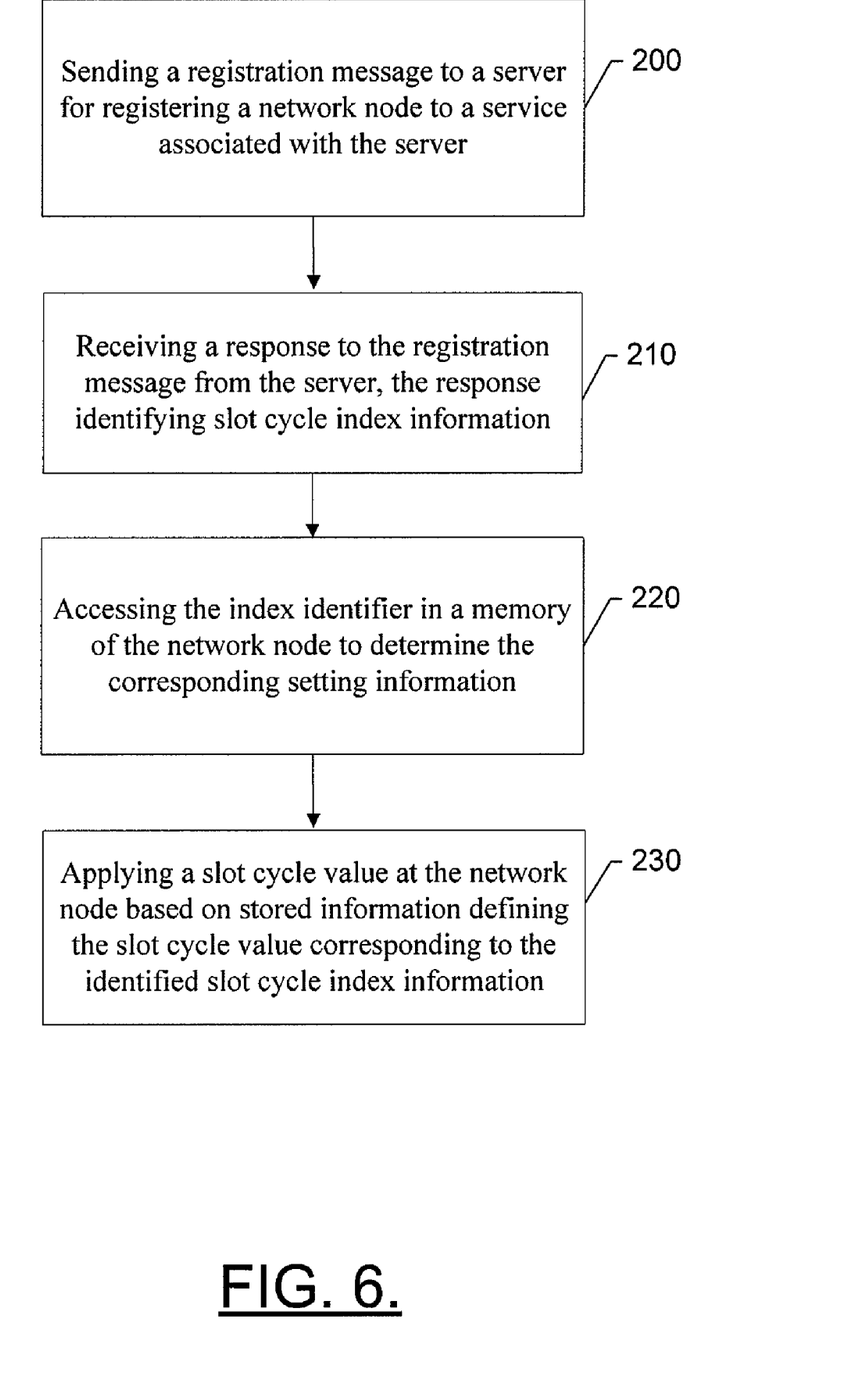
FIG. 6 is a flowchart according to an exemplary method and program product from the perspective of a mobile terminal for providing dynamic assignment of slot cycle index according to an exemplary embodiment of the present invention.

FIGS. 5 and 6 are flowcharts according to exemplary methods and program products for providing dynamic assignment of slot cycle index at a network node such as a mobile terminal according to an exemplary embodiment of the present invention. As will be appreciated, for example, computer program instructions may be loaded onto a computer or other programmable apparatus (i.e., hardware) to produce a machine, such that instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

In this regard, one embodiment of a method of providing dynamic assignment of slot cycle index at a network node, as shown in FIG. 5, may include receiving a registration message for registering a network node to a service at operation 100. In an exemplary embodiment, the registration message may be a message for registering the network node to a push-to-talk service. At operation 110, slot cycle index information associated with the network node may be acquired. In an exemplary embodiment, operation 110 may include querying a subscriber database for the slot cycle index information and receiving at least an index identifier corresponding to setting information defining a slot cycle value for the network node. The slot cycle index information may be communicated to the network node at operation 120. In an exemplary embodiment, operation 120 may include transmitting a response to the registration message in which the response includes a slot cycle index field identifying an index identifier corresponding to setting information defining a slot cycle value for the network node.

Another embodiment of a method of providing dynamic assignment of slot cycle index at a network node, as shown in FIG. 6, may include sending a registration message to a server for registering a network node to a service associated with the server at operation 200. In an exemplary embodiment, operation 200 may include sending a message for registering the network node to a push-to-talk service. At operation 210, a response to the registration message may be received from the server. The response may identify slot cycle index information. In an exemplary embodiment, operation 210 may include receiving at least an index identifier corresponding to setting information defining the slot cycle value. In another exemplary embodiment, the method may further include accessing the index identifier in a memory of the network node to determine the corresponding setting information at operation 220. A slot cycle value may be applied at the network node based on stored information defining the slot cycle value corresponding to the identified slot cycle index information at operation 230. In an exemplary embodiment, operation 230 may include altering the sleep period of the network node according to the slot cycle value.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for providing dynamic assignment of slot cycle index comprising:
receiving a registration message from a network node for registering the network node to a service;
based on the registration message, acquiring slot cycle index information associated with the network node, the acquired slot cycle index information including an index identifier; and
communicating the slot cycle index information to the network node to apply applicable slot cycle index parameters based on the communicated slot cycle index information, the slot cycle index parameters stored in the network node.

2. The method of claim 1, wherein acquiring the slot cycle index information comprises querying a subscriber database for the slot cycle index information and receiving at least an index identifier corresponding to setting information defining a slot cycle value for the network node.

3. The method of claim 1, wherein receiving the registration message comprises receiving a message for registering the network node to a push-to-talk service.

4. The method of claim 1, wherein communicating the slot cycle index information comprises transmitting a response to the registration message in which the response includes a slot cycle index field identifying an index identifier corresponding to setting 5. A non-transitory computer-readable storage medium having computer-readable program code portions stored therein for providing dynamic assignment of slot cycle index, the computer-readable program code portions comprising: a first executable portion for receiving a registration message from a network node for registering the network node to a service; a second executable portion for acquiring, based on the registration message, slot cycle index information associated with the network node, the acquired slot cycle index information including an index identifier; and a third executable portion for communicating the slot cycle index information to the network node to apply applicable slot cycle index parameters based on the communicated slot cycle index information, the slot cycle index parameters stored in the network node.

6. The non-transitory computer-readable storage medium of claim 5, wherein the second executable portion includes instructions for querying a subscriber database for the slot cycle index information and receiving at least an index identifier corresponding to setting information defining a slot cycle value for the network node.

7. The non-transitory computer-readable storage medium of claim 5, wherein the first executable portion includes instructions for receiving a message for registering the network node to a push-to-talk service.

8. The non-transitory computer-readable storage medium of claim 5, wherein the third executable portion includes instructions for transmitting a response to the registration message in which the response includes a slot cycle index field identifying an index identifier corresponding to setting information defining a slot cycle value for the network node.

9. An apparatus for providing dynamic assignment of slot cycle index comprising a processing element configured to:
receive a registration message from a network node for registering the network node to a service;
based on the registration message, acquire slot cycle index information associated with the network node, the acquired slot cycle index information including an index identifier; and
communicate the slot cycle index information to the network node to apply applicable slot cycle index parameters based on the communicated slot cycle index information, the slot cycle index parameters stored in the network node.

10. The apparatus of claim 9, wherein the processing element is further configured to query a subscriber database for the slot cycle index information and receive at least an index identifier corresponding to setting information defining a slot cycle value for the network node.

11. The apparatus of claim 9, wherein the processing element is further configured to receive a message for registering the network node to a push-to-talk service.

12. The apparatus of claim 9, wherein the processing element is further configured to transmit a response to the registration message in which the response includes a slot cycle index field identifying an index identifier corresponding to setting information defining a slot cycle value for the network node.

13. A method for providing dynamic assignment of slot cycle index comprising:
sending from a network node a registration message to a server for registering the network node to a service associated with the server;
receiving a response to the registration message from the server, the response identifying slot cycle index information and including an index identifier; and
applying a slot cycle value at the network node based on stored information in the network node defining the slot cycle value corresponding to the identified slot cycle index information and the index identifier.

14. The method of claim 13, wherein sending the registration message comprises sending a message for registering the network node to a push-to-talk service.

15. The method of claim 13, wherein receiving the response to the registration message comprises receiving at least an index identifier corresponding to setting information defining the slot cycle value.

16. The method of claim 15, further comprising accessing the index identifier in a memory of the network node to determine the corresponding setting information.

17. The method of claim 13, wherein applying the slot cycle value.

18. A non-transitory computer-readable storage medium having computer-readable program code portions stored therein for providing dynamic assignment of slot cycle index, the computer-readable program code portions comprising: a first executable portion for sending from a network node a registration message to a server for registering the network node to a service associated with the server; a second executable portion for receiving a response to the registration message from the server, the response identifying slot cycle index information and including an index identifier; and a third executable portion for applying a slot cycle value at the network node based on stored information in the network node defining the slot cycle value corresponding to the identified slot cycle index information and the index identifier.

19. The non-transitory computer-readable storage medium of claim 18, wherein the first executable portion includes instructions for sending a message for registering the network node to a push-to-talk service.

20. The non-transitory computer-readable storage medium of claim 18, wherein the second executable portion includes instructions for receiving at least an index identifier corresponding to setting information defining the slot cycle value.

21. The non-transitory computer-readable storage medium of claim 20, further comprising a fourth executable portion for accessing the index identifier in a memory of the network node to determine the corresponding setting information.

22. The non-transitory computer-readable storage medium of claim 18, wherein the third executable portion includes instructions for altering the sleep period of the network node according to the slot cycle value.

23. An apparatus for providing dynamic assignment of slot cycle index comprising:
a communication interface element configured to send from a network node a registration message to a server for registering a the network node to a service associated with the server;
receive, by the communication interface element, a response to the registration message from the server, the response identifying slot cycle index information and including an index identifier; and
a processing element configured to apply a slot cycle value at the network node based on stored information in the network node defining the slot cycle value corresponding to the identified slot cycle index information and the index identifier.

24. The apparatus of claim 23, wherein the processing element is further configured to send a message for registering the network node to a push-to-talk service.

25. The apparatus of claim 23, wherein the processing element is further configured to receive at least an index identifier corresponding to setting information defining the slot cycle value.

26. The apparatus of claim 25, wherein the processing element is further configured to access the index identifier in a memory of the network node to determine the corresponding setting information.

27. The apparatus of claim 23, wherein the processing element is further configured to alter the sleep period of the network node according to the slot cycle value.

28. A system for providing dynamic assignment of slot cycle index, the system comprising a provisioning sub-system configured to modify slot cycle index information at a subscriber database based on grade of service requests associated with at least one subscriber on a per subscriber basis, the slot cycle index information including an index identifier corresponding to slot cycle index parameters stored in a network node of the at least one subscriber, the parameters to be applied to the network node in response to a registration message from the network node, and
the provisioning sub-system comprising at least one computer-readable storage medium having computer-readable code portions stored therein to implement said modification.

29. The system of claim 28, further comprising a server configured to:
receive a registration message from a network node, the registration message being for registering the network node to a service; acquire slot cycle index information associated with the network node from the subscriber database; and communicate the slot cycle index information to the network node.

30. The system of claim 28, wherein the subscriber database includes slot cycle information for a plurality of subscribers on a per subscriber basis and wherein the slot cycle information is capable of modification in response to instructions from the provisioning sub-system,
the subscriber database comprising at least one computer-readable storage medium having computer-readable code portions stored therein to store said information and modifications.

* * * * *

UNITED STATES PATENT AND TRADEMARK OFFICE
CERTIFICATE OF CORRECTION

PATENT NO. : 7,844,244 B2  Page 1 of 1
APPLICATION NO. : 11/678119
DATED : November 30, 2010
INVENTOR(S) : Fangqiu Tu It is certified that error appears in the above-identified patent and that said Letters Patent is hereby corrected as shown below:

In Column 10

At line 16, after "setting", please insert --information defining a slot cycle value for the network node.--.

Signed and Sealed this
Seventh Day of June, 2011

David J. Kappos
*Director of the United States Patent and Trademark Office*